United States Patent [19]
Chanteloup et al.

[11] Patent Number: 5,994,687
[45] Date of Patent: Nov. 30, 1999

[54] SYSTEM FOR CORRECTION THE SHAPE OF A WAVE-FRONT OF A LASER BEAM

[75] Inventors: Jean-Christophe Chanteloup; Jean-Pierre Huignard, both of Paris; Brigitte Loiseaux, Bures sur Yvette; Pierre Tournois, Cagnes S/Mer, all of France

[73] Assignee: Thomson-CSF, Paris, France

[21] Appl. No.: 08/932,097

[22] Filed: Sep. 17, 1997

[30] Foreign Application Priority Data

Sep. 17, 1996 [FR] France ................................. 96 11304

[51] Int. Cl.$^6$ ....................................................... G01J 1/20
[52] U.S. Cl. ........................................ 250/201.9; 356/121
[58] Field of Search ............................. 250/201.9, 201.1, 250/216; 356/354, 121, 363

[56] References Cited

U.S. PATENT DOCUMENTS 3,764,213  10/1973  O'Meara ............................. 250/201.9
5,398,130  3/1995   Redman .............................. 250/201.9

FOREIGN PATENT DOCUMENTS 89 05 405 U   7/1989   Germany .
42 12 779    10/1993   Germany .

OTHER PUBLICATIONS

F.L. Vladimirov, et al., "Conversion of Optical Signals in a Laser with an Intracavity Liquid–Crystal Spatial Modulator," Soviet Journal of Quantum Electronics, vol. 31, No. 10, (Oct. 1985), pp. 1363–1367.

C.B. Dane, et al., "Design and Operation of a 150 W Near Diffraction–Limited Laser Amplifier with SBS Wavefront Correction," IEEE Journal of Quantum Electronics, vol. 31, No. 1, (Jan. 1995), pp. 148–163.

Primary Examiner—Edward P. Westin
Assistant Examiner—Kevin Pyo
Attorney, Agent, or Firm—Oblon, Spivak, McClelland, Maier & Neustadt, P.C.

[57] ABSTRACT

A system for the control of light beams includes a beam splitter placed on the path of the beam to be controlled and deriving a measurement beam from this beam; a detection device receiving the measurement beam and measuring the shape of the wave front of the measurement beam; a wave-front shape correction device placed on the path of the beam to be controlled, activated by the detection device and correcting the shape of the wave front of the beam to be controlled. The detection device includes a light spatial modulator providing for the selective transmission of the portions of the measurement beam; a focusing device receiving the different portions of the measurement beam; a series of photodetectors placed along the focusing plane of the focusing device; a device for the identification of the photodetector or photodetectors, detecting a light wave and computing the shape of the wave front as a function of the photodetectors identified.

11 Claims, 4 Drawing Sheets

SYSTEM FOR CORRECTION THE SHAPE OF A WAVE-FRONT OF A LASER BEAM

BACKGROUND OF THE INVENTION

The invention relates to a system for the control of light beams, and especially to a system for the correction of the shape of the wave front of a laser beam.

The quality of laser beams is disturbed by thermal lens effects that arise out of the inhomogenous pumping of the laser rods by flash lamps or by diodes. It is important to maintain a quality of the beam that is as close as possible to the diffraction limit, in particular, whatever may be the rate and mean power delivered by the source. The object of the invention is to propose a continuous source or pulsed source architecture capable of delivering a very high-quality wave out of a liquid crystal cell fulfilling the role of a 2D phase modulator.

SUMMARY OF THE INVENTION

The invention therefore relates to a system for the control of light beams comprising:
  a beam splitter placed on the path of the beam to be controlled and deriving a measurement beam from this beam to be controlled;
  a detection device receiving the measurement beam and measuring the shape of the wave front of the measurement beam;
  a wave-front shape correction device placed on the path of the beam to be controlled, activated by the detection device and correcting the shape of the wave front of the beam to be controlled;
wherein the detection device comprises:
  a light spatial modulator providing for the selective transmission of the portions of the measurement beam;
  a focusing device receiving the different portions of the measurement beam;
  a series of photodetectors placed along the focusing plane of the focusing device;
  a device for the identification of the photodetector or photodetectors, detecting a light wave and computing the shape of the wave front as a function of the photodetectors identified.

BRIEF DESCRIPTION OF THE DRAWINGS

The various objects and features of the invention shall appear from the following description and the appended figures of which.

MORE DETAILED DESCRIPTION

Figure 1A:
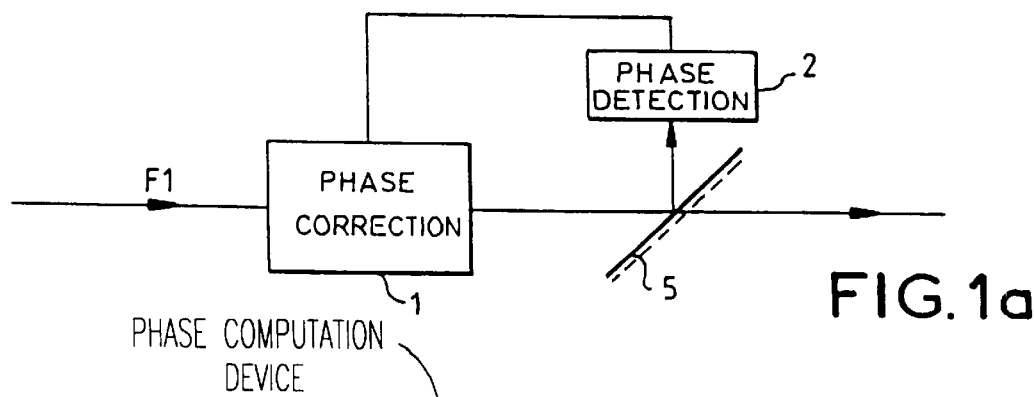
FIGS. 1a and 1b shows a laser architecture according to the invention.

FIG. 1a shows a general view of the system of the invention. What has to be done is to control the shape of the wave front of a light beam F1 and more specifically to correct its phase distortions.

A beam splitter 5 is placed on the path of the light beam F1 and picks up a small part of this beam to transmit it to a phase detection device 2. This detection device analyzes the shape of the wave front and, in particular, analyzes the phase shift of the wave front.

A wave shape correction device 1 is placed on the path of the light beam F1 upstream with respect to the beam splitter 5. This correction device is controlled by the phase detection device 2. It is used to spatially induce phase shifts as a function of the different phases pertaining to the different points of the wave front detected and therefore to correct the shape of the wave front.

Figure 1B:
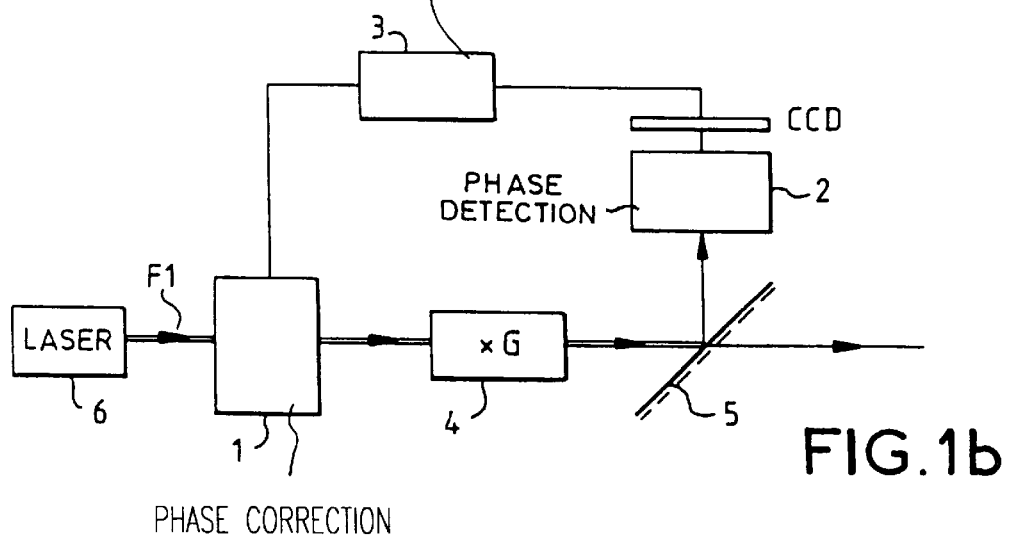

According to the invention, a device of this kind is integrated into a laser source (FIG. 1b) comprising a low energy oscillator 6 and one or more high gain amplifiers 4. The beam correction device 1 is placed between the oscillator 6 and the amplifier 4. The beam splitter is located at output of the amplifier.

A device of this kind is thus used to correct the phase distortions of a light beam and give a corrected plane wave.

The wave front correction device 1 is preferably a 2D spatial modulator in which a voltage applied to each pixel generates a phase shift. From the wave phase, by means of the detection device, it is therefore possible to apply voltage-generating phase shifts to the different image elements of the spatial modulator 1. Thus, since the incident wave is pre-distorted by the spatial modulator 1, a phase-corrected beam is obtained. The incident wave is a low energy wave and, after passage into the amplifier, an intense beam is obtained, the quality of which is not affected by the phase aberration and especially by the aberration due to the amplifier.

In other words, the proposed system is equivalent to an electrooptical phase plate generating, in transmission, the conjugate wave of the aberrant wave coming from the amplifier.

Figure 2:
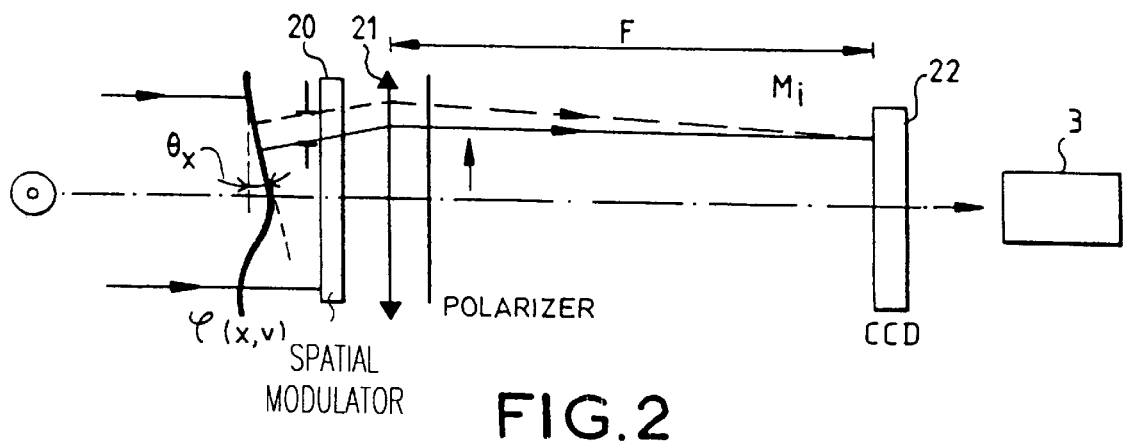
FIG. 2 shows a wave-front shape detection device.
Figure 3:
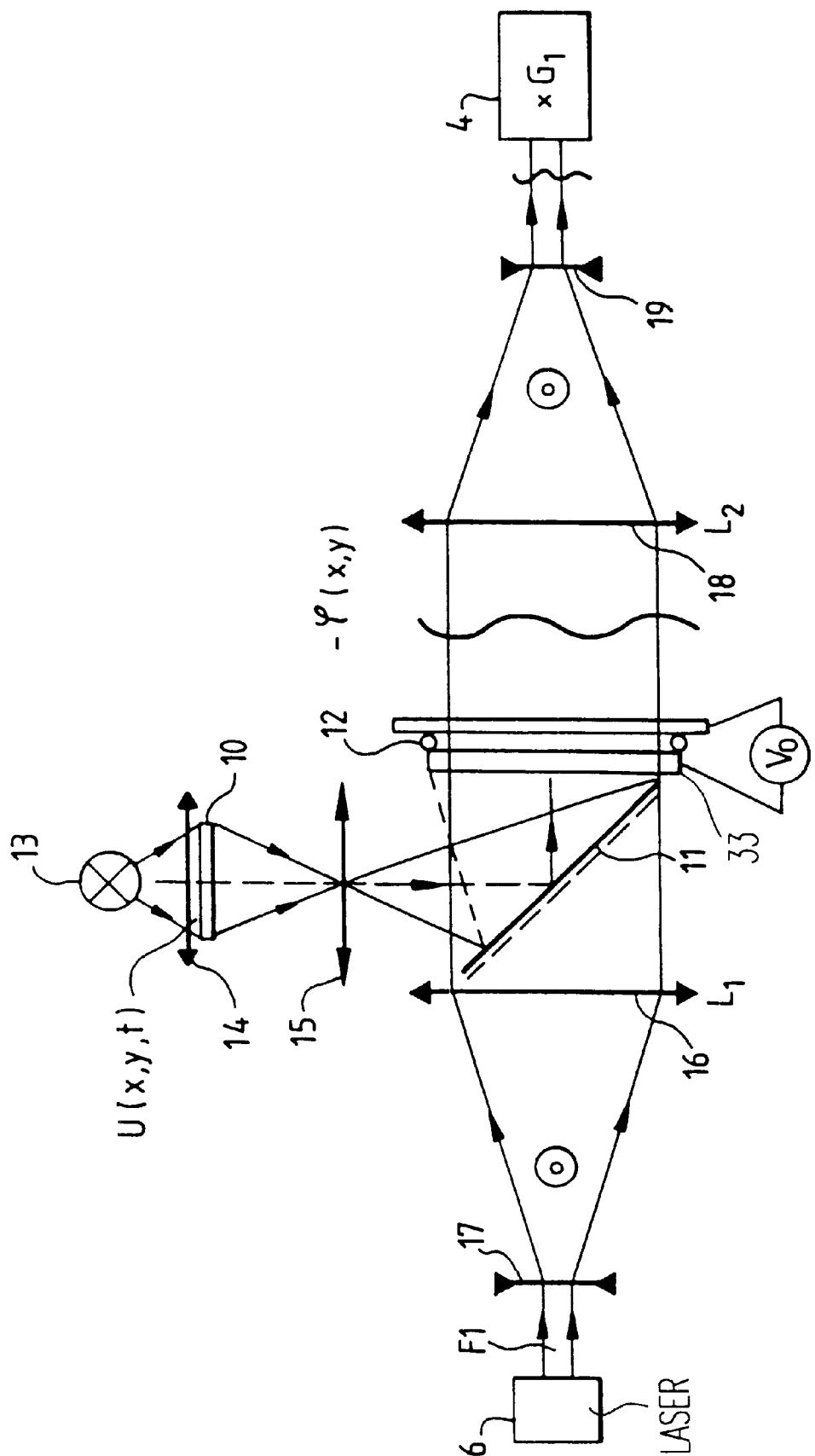
FIG. 3 shows a wave-front shape correction device.

The implementation of this system is obtained by means of FIGS. 2 and 3.

Measurement of the phase of the aberrant wave:

The phase measurement is obtained by an NxN liquid crystal screen whose function is that of a network of electrooptical shutters.

For each aperture selected on the modulator 20, an elementary plane wave that gets focused at a point $M_i$ is detected. The coordinates of this point on the CCD 22 camera determine the slopes $\theta_x$ and $\theta_y$ of the wave front about each pixel of the network of shutters. Thus, by the sequential scanning of the matrix of NxN pixels, there is obtained, after computation (circuit 3 of FIG. 2 corresponding to the circuit 3 of FIG. 1b) the phase relationship $-\phi_i$ (x, y) to be generated on the spatial modulator 1 placed before the amplifier.

Phase spatial modulator 1 for the generation of the conjugate wave before amplification:

To carry out this function the invention implements a structure of spatial modulation whose diagram is given in FIG. 3. It uses two liquid crystal modulators:
  an active matrix 10 with matrix control, of the small-sized TV liquid crystal screen type;
  a liquid crystal valve or cell 12 addressed by photoconductor designed to modulate the phase of the laser beam with the relationship $-\phi_i$ (x, y).

According to FIG. 3, the active matrix 10 is projected on the photoconductor 33 by means of an objective 20 and a compact incoherent source 13 (a halogen lamp, electroluminescent diodes or the like) emitting in the domain of spectral sensitivity of the photoconductor. The obtaining of a phase law $-\phi_i$ (x, y) on the laser beam F1 results from the following operation:
  the generation on the active matrix 10 of a spatial distribution with an intensity $I_i$ (x, y) projected on the photoconductor;

the generation of the phase relationship $-\phi_i$ (x, y) by means of the optical addressing cell 12. The phase is modulated by the voltage distribution U (x, y) which is induced by local illumination $I_i$ (x, y) of the photoconductor.

The efficient working of this 2D spatial modulation structure requires the performance of a precise calibration of the time function of the device with phase shift induced as a function of the addressing voltage of each pixel of the active matrix. Furthermore, it is very important to slightly defocus the image of the active matrix projected on the cell so as to obtain a smoothing of the relationship of illumination on the photoconductor: thus, the laser wave front is not disturbed by the image of the "pixelized" structure of the active matrix. The photoconductor is chosen to be photoactivated solely at the wavelength of illumination of the active matrix. It is transparent for the wavelength of the beam to be corrected (F1).

Exemplary embodiment:

The light source may be a MOPA type Nd-YAG laser source working in ns mode;

The phase measurement is made on $10^2 \times 10^2$ points;

the choice of a ferroelectric liquid crystal spatial modulator 20 with matrix addressing pixel computation time: 10 μs; dimension of the pixel: 200×200 μm² (standard format CCD camera);

The phase correction device comprises a photoconductor/nematic liquid crystal cell with parallel alignment, adapted to the phase modulation.

Example: BSO—liquid crystal or CdSe—liquid crystal. Recording λ=450–550 nm–reading λ>800 nm. Applied voltage: U=20 volts–50 Hz. Induced phase shift $$\left(\Delta\varphi = 2\pi \frac{d \Delta n}{\lambda}\right)$$

Δφ=8π with d=20 μm, Δn=0.2 and λ=1.06 μm.

The photoconductor may be illuminated by an incoherent source emitting for example in the blue or green range by means of a halogen source, an arc lamp, a light-emitting diode, etc.

The active matrix 10 is of the liquid crystal active matrix type with a standard television format illuminated by source 13 and projected on the photoconductor cell 12. This liquid crystal matrix has for example 620×480 pixels with dimensions of 50 μm;

The circuits 3 are means for the computation of the phase φ(x, y) through the measurement of the position of the maximum intensity of each point of the plane of detectors of the detection device 2;

There are also provided means matching the laser beam to the dimension and geometry of the photoconductor/liquid crystal cell. FIG. 3 represents these means by the lenses 16 and 17. The section of the beam for the illumination of the modulator 10 is matched with the surface of the cell 12 by the lenses 14 and 15. Furthermore, at output of the cell 12, lenses 18 and 19 adapt the section of the beam to the size to the amplifier 4.

Advantages presented by the device:

The proposed source architecture implements liquid crystal components whose technology is well controlled by the display applications;

The same types of component and technology are adapted to continuous or pulsed laser sources whether visible or in the infra-red range. There is therefore a great diversity of use for phase control modules and for the measurement of the wave front;

The wave front is not affected by "pixelization" effects;

The double addressing structure is not "pixelized" (the electrode of the photoconductor/liquid crystal cell is uniform) and consequently does not introduce any effects of parasitic diffraction due to the standard matrix control structures;

The phase may be controlled on a great number of points, typically 32×32→$10^2 \times 10^2$, phase deviation 0→2 π (or possibly 4 π or 6 π) depending on the thickness and direction of the liquid crystal;

The behavior under flux of a cell type homogenous structure for the wave front corrector is greater than that of the "pixelized" screens;

The set of components works at the video rate and implements display technologies;

The structure of analysis of the aberrant wave front is especially well suited to a laser structure; unlike the standard HARTEMANN techniques developed for adaptive optics, this technique does not require arrays of microlenses and uses a standard CCD camera with TV resolution;

The entire control system of the beam is adapted to both continuous and pulse sources whether in the visible or in the infrared range. The liquid crystals are electrooptical materials transparent from the visible to the infrared range, possibly up to 10 μm. In this case, the optical cell and the analysis cell of the wave front will be made on substrates transparent to the infrared. It may be noted that the materials adapted to the generation of a conjugate wave by non-linear interactions do not possess as varied a field of application: the Brillouins cells work in ns mode, and the photorefractive crystals may be adapted to the visible domain for continuous sources.

Figure 4:
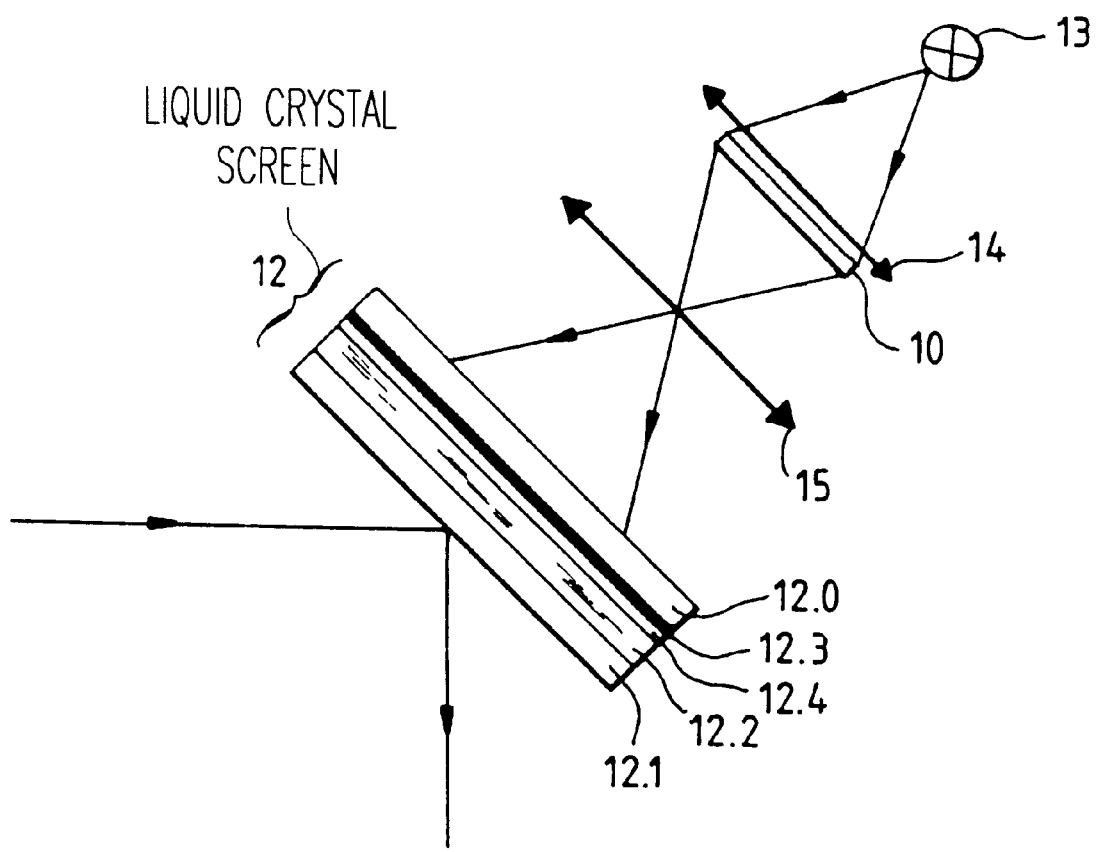
FIGS. 4 and 5 show alternative embodiments of the device of the invention.

FIG. 4 shows an embodiment in which the phase correction device works in reflection mode instead of in transmission mode. It has a liquid crystal screen inclined with respect to the direction of the beam to be corrected. This screen has two transparent plates 12.0 and 12.1 between which the liquid crystal 12.2 is located. The plate has a layer of photoconductor material 12.3 covered with a reflective dielectrical material 12.4 (dielectrical mirror). The liquid crystal screen, through the rear, on the photoconductor material, receives the control beam enabling the conductivity of the photoconductor material to be changed locally and enabling the induction of the phase modulations in the beam that is to be corrected.

Figure 5:
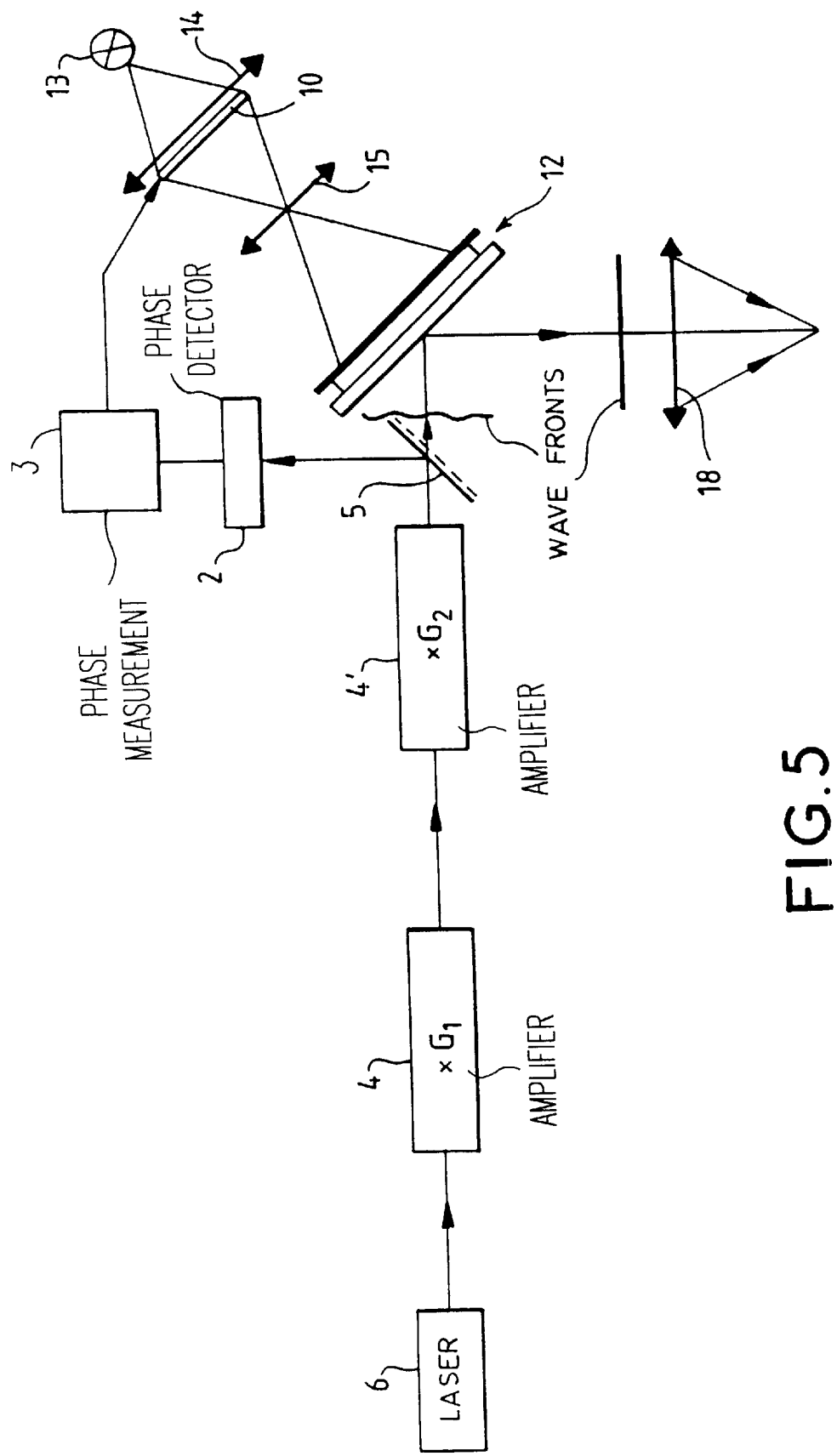

FIG. 5 shows an alternative embodiment in which the phase correction is done after amplification of the laser beam. After amplification by the amplifier or amplifiers 4, 4', the light beam may comprise distortions. The splitter 5 picks up a small part of the beam which is analyzed by the wave front detection device which controls the wave front correction device. For example, in FIG. 5, the wave front correction device works in reflection mode and gives a phase-corrected wave front.

What is claimed is:

1. A system for controlling light beams, comprising:

a beam splitter receiving said beams to be controlled and outputting a measurement beam;

a detection device receiving said measurement beam and measuring a shape of a wave front of said measurement beam;

a wave-front shape correction device positioned in a path of said beams to be controlled wherein said wave-front shape correction device receives an output of said detection device and provides a correction device output for correcting the shape of said wave-front of the beams to be controlled, wherein said detection device comprises:

a light detector spatial modulator receiving said measurement beam and selectively transmitting selected portions of said measurement beam;

a focusing device receiving said selected portions output from said light detector spatial modulator and focusing said selected portions in a focusing plane;

a series of photodetectors positioned in said focusing plane;

computation means for computing a phase of the wave-front as a function of the maximum intensity of each point of said plane containing said photodetector.

2. A system according to claim 1, wherein the wave-front shape correction device is placed on the path of the beams to be controlled upstream with respect to the beam splitter.

3. A system according to claim 1, wherein the wave-front shape correction device is placed on the path of the beams to be controlled downstream with respect to the beam splitter.

4. A system according to claim 1, wherein the detection device measures the phase of the measurement beam at various points of the cross-section of the measurement beam and wherein the wave-front shape correction device corrects the phase of the wave front at different points of the beams to be controlled.

5. A system according to claim 1, further comprising an oscillator emitting an optical wave to an optical amplifier, the wave-front shape correction device being placed between the oscillator and the optical amplifier and the beam splitter being placed at the output of the optical amplifier.

6. A system according to claim 1, wherein the series of photodetectors is a CCD matrix.

7. A system according to claim 1, wherein the detector spatial modulator is a liquid crystal modulator with matrix control, each pixel of which is activated either to block the passage of light or to transmit light.

8. A system according to claim 1, wherein the wave-front shape correction device comprises:

a first light spatial modulator with matrix control, activated by the detection device, and a second light spatial modulator comprising a layer of photoconductor material and placed on the path of the beams to be controlled;

a light source illuminating the first spatial modulator with matrix control, which transmits a modulated beam to the layer of photoconductor material of the second light spatial modulator.

9. A system according to claim 8, comprising:

a first optical device to match the section of the modulated beam of the first modulator with the surface of the second modulator;

a second optical device to match the section of the beams to be controlled with the surface of the second modulator;

a third optical device to match the section of the beam transmitted by the second modulator with the input surface of an amplification device.

10. A system according to claim 9, wherein the first modulator projects an image on said second modulator by adjusting the focusing of an image to be projected.

11. A system according to claim 8, wherein the second spatial modulator works in reflection with respect to the beams to be controlled, the layer of photoconductor material receiving the modulated beam at the rear of the second spatial light modulator with respect to the direction of incidence of the beam to be controlled.

* * * * *

UNITED STATES PATENT AND TRADEMARK OFFICE
CERTIFICATE OF CORRECTION

PATENT NO. : 5,994,687

DATED : November 30, 1999

INVENTOR(S): Jean-Christophe CHANTELOUP, et al.

It is certified that an error appears in the above-identified patent and that said Letters Patent is hereby corrected as shown below:

On the title page, item [54] and the top of column 1 should read:

-- [54]  SYSTEM FOR CORRECTING THE SHAPE OF
         A WAVE-FRONT OF A LASER BEAM --

Signed and Sealed this

Sixth Day of March, 2001

Attest:

NICHOLAS P. GODICI

Attesting Officer

Acting Director of the United States Patent and Trademark Office